United States Patent
Laun et al.

(10) Patent No.: US 6,983,566 B2
(45) Date of Patent: Jan. 10, 2006

(54) DOOR AND FRAME WITH PERIPHERAL VENTING FOR ELECTRONIC COMPONENT CABINET

(75) Inventors: Deborah A. Laun, Syracuse, NY (US); Robert L. Naas, Skaneateles, NY (US)

(73) Assignee: Upstate Systems Tec. Inc., Victor, NY (US)

( * ) Notice: Subject to any disclaimer, the term of this patent is extended or adjusted under 35 U.S.C. 154(b) by 27 days.

(21) Appl. No.: 10/150,428

(22) Filed: May 17, 2002

(65) Prior Publication Data

US 2002/0174611 A1 Nov. 28, 2002

Related U.S. Application Data

(60) Provisional application No. 60/292,986, filed on May 23, 2001.

(51) Int. Cl.
*E06B 3/00* (2006.01)

(52) U.S. Cl. ............... 49/507; 454/184; 312/223.2; 49/504

(58) Field of Classification Search ............ 49/507, 49/501, 504, 401; 312/223.2; 361/690, 691, 361/692, 687, 695, 714, 831; 454/184, 236
See application file for complete search history.

(56) References Cited

U.S. PATENT DOCUMENTS

| | | | | |
|---|---|---|---|---|
| 4,659,349 A | * | 4/1987 | Rodi et al. | 55/385.4 |
| 4,860,163 A | * | 8/1989 | Sarath | 361/695 |
| 5,467,250 A | | 11/1995 | Howard et al. | |
| 5,493,473 A | * | 2/1996 | Yanagi | 361/695 |
| 5,782,546 A | | 7/1998 | Iwatare | |
| 5,801,331 A | * | 9/1998 | Zachrai | 174/52.1 |
| 5,889,648 A | | 3/1999 | Heavirland et al. | |
| 6,000,769 A | | 12/1999 | Chen | |
| 6,108,331 A | | 8/2000 | Thompson | |
| 6,134,109 A | | 10/2000 | Muller et al. | |
| 6,164,369 A | | 12/2000 | Stoller | |
| 6,179,398 B1 | * | 1/2001 | Martin | 312/265.4 |
| 6,288,333 B1 | | 9/2001 | Liu et al. | |
| 6,462,944 B1 | | 10/2002 | Lin | |

* cited by examiner

*Primary Examiner*—Gregory J. Strimbu
(74) *Attorney, Agent, or Firm*—Brown & Michaels, P.C.

(57) ABSTRACT

A door and frame for electronic component cabinets features a peripheral vent with a baffle that substantially encompasses the entire 360-degree periphery of the door. This vent and baffle combination provides ventilation for the purposes of the electrical equipment when the door and frame are mounted to an electronic component cabinet. It also helps to avoid dust invasion and helps to eliminate dangers that can arise due to the insertion of objects into the cabinet by small children. In addition, it is invisible from the front of the component cabinet and is sleekly attractive from the front and side.

5 Claims, 3 Drawing Sheets

DOOR AND FRAME WITH PERIPHERAL VENTING FOR ELECTRONIC COMPONENT CABINET

This application claims the benefit of U.S. Provisional Application No. 60/292,986 filed on May 23, 2001, which provisional application is incorporated by reference herein.

TECHNICAL FIELD

This invention deals with cabinets and casings for electronic and electrical equipment.

BACKGROUND OF THE INVENTION

Cabinets for electronic and electrical equipment must often make provision for venting excess heat generated by the electrical components in the cabinet. This problem is particularly acute for inset cabinets such as those typically located in finished locations. In these cabinets, the case is mounted into a wall cavity; thus, all venting must be through the front of the case into the open air. This can require a great number of holes, slots, and/or louvers in the cabinet door or cover mounted over the front of the case. Aside from the unattractive esthetic effect created by the presence of such openings, these holes, slots, and louvers can provide means for the entry of dust into the case. In addition, they can also be dangerous where children are present as young children often have a tendency to push objects into such openings. This can lead to component damage due to contact between such objects and the equipment in the cabinet. More ominously, it could even lead to dangerous electrical shocks due to contact between a hand-held object and the electrically powered components in the cabinet.

SUMMARY OF THE INVENTION

The door and frame with peripheral venting we have invented solves the problem of providing adequate ventilation in a manner that is esthetically pleasing, sensible, and safer than prior art arrangements. Our door and frame are composed of a peripheral vent with a baffle at their junction that substantially encompasses the entire 360-degree periphery of the door. This vent and baffle combination not only provides more than adequate ventilation for the purposes of the electrical equipment when the door and frame are mounted to an electronic component cabinet, its design helps to avoid dust invasion and substantially eliminates the dangers that can arise due to the insertion of objects into the cabinet by small children. In addition, it solves the esthetic problems associated with prior designs, as it is invisible from the front of the component cabinet and sleekly attractive from the front and side.

DESCRIPTION OF THE INVENTION

The frame 1 of my invention is provided with a louver-like baffle 1A that is canted inwardly at approximately 45 degrees from the outer edge of frame 1. Door 2 has a peripheral edge 2A that does not contact the frame 1 around most of the periphery of door 2 and frame 1 when door 2 is closed. The gap between the peripheral edge 2A of door 2 and frame 1 creates a ventilation air pathway 3 that extends around almost the entire 360-degree periphery of the door 2 and frame 1 combination. Ventilation air pathway 3 is invisible from the front and creates a pleasing appearance from the sides.

The arrangement and design of baffle 1A of air pathway 3 is particularly important with regard to the other benefits offered by our invention. First, as dust primarily settles from above, the location and design of baffle 1A tends to divert any dust entering the component cabinet away from the electronic components towards the inside of door 2. Second, if the baffle 1A was located on the door 2 of our invention, it would allow a child to insert a linear object through the ventilation air pathway 3 and contact the internal components of the electronic component cabinet on which our invention is mounted. By mounting the baffle 1A on the frame 1 of our invention, we have assured that the length of any linear object inserted through ventilation air pathway 3 will tend to be relatively short. (Its length will be limited by the distance between the wall on which our invention is mounted and the opening of ventilation air pathway 3.) In addition, we have assured that any linear object inserted will impact the inside of door 2 rather than the components contained in the electronic component cabinet. Both of these factors increase the overall safety of our design.

Figure 1:
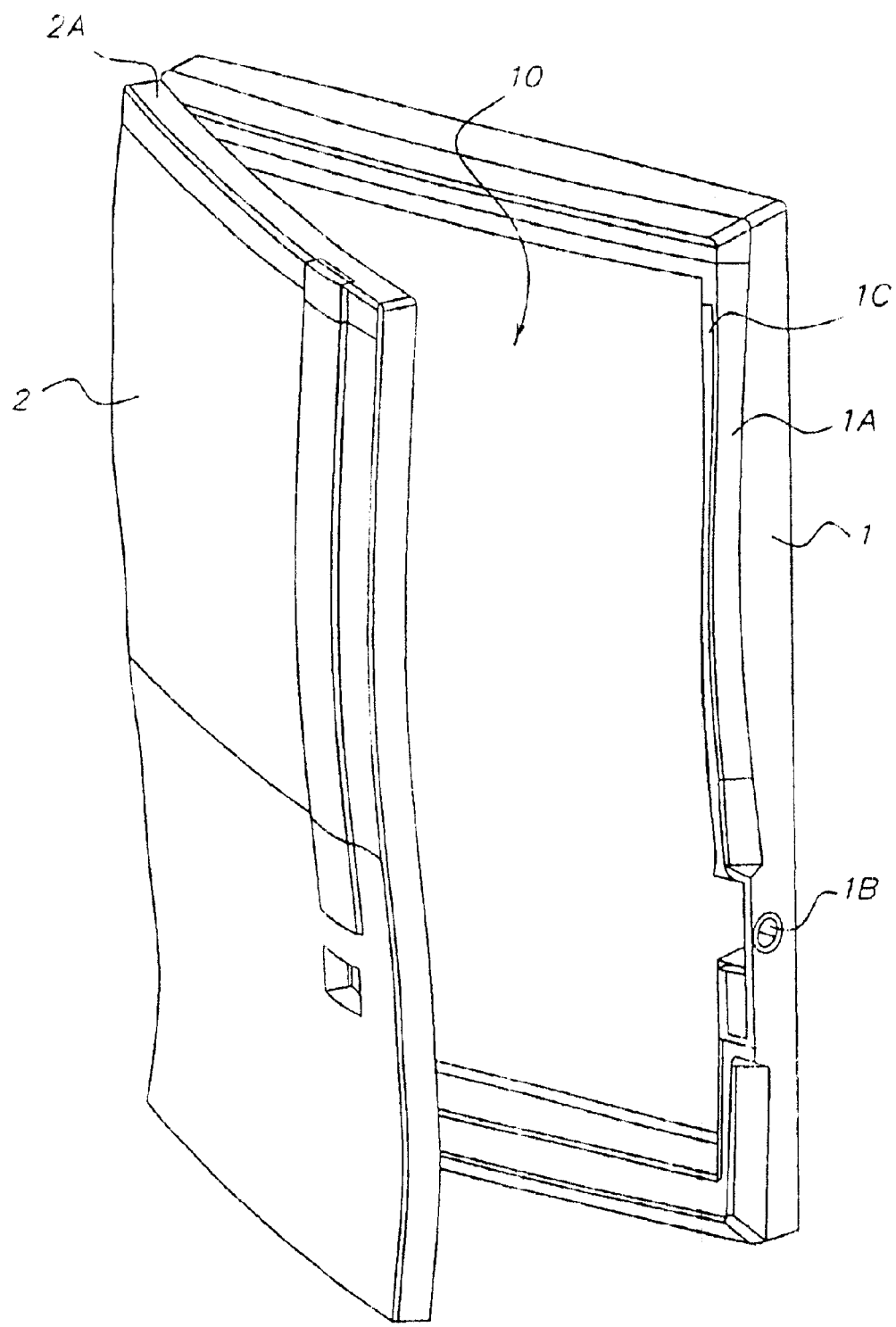
FIG. 1 provides a first perspective view from the front and side illustrating the vented door and frame combination of this invention when partially open.
Figure 2:
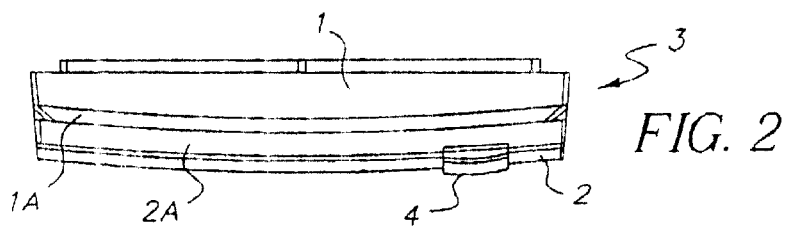
FIG. 2 provides a view from above the vented door and frame combination of this invention.
Figure 3:
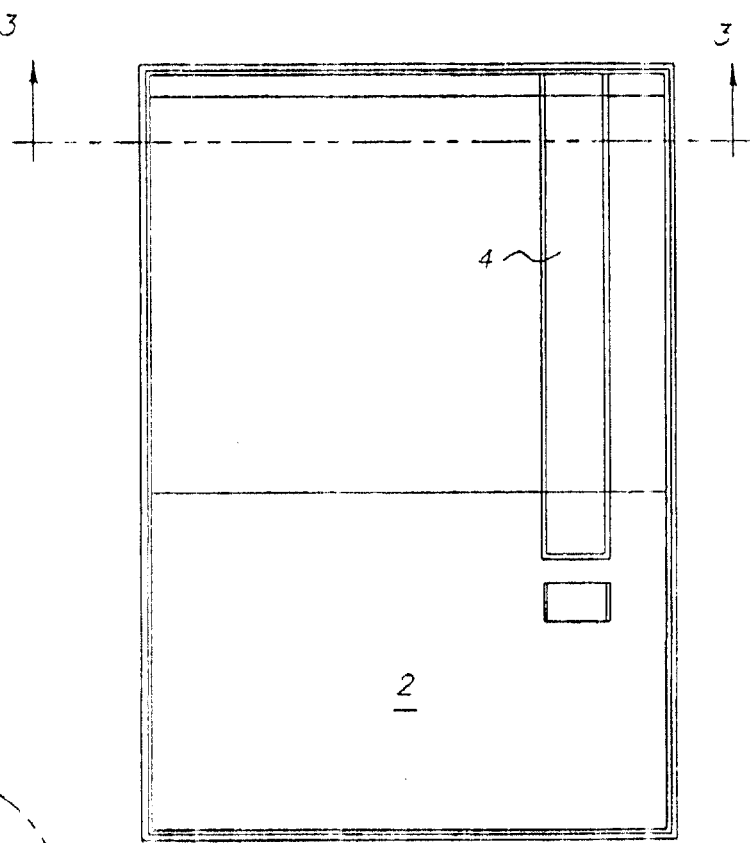
FIG. 3 provides a view from the front of the vented door and frame combination of this invention.
Figure 4B:
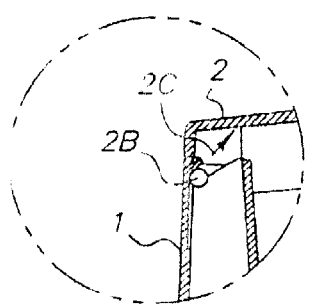
FIG. 4B provides a more detailed view of circled area B of FIG. 4A, further illustrating the snap-in hinges joining the vented door and frame of this invention.
Figure 4A:
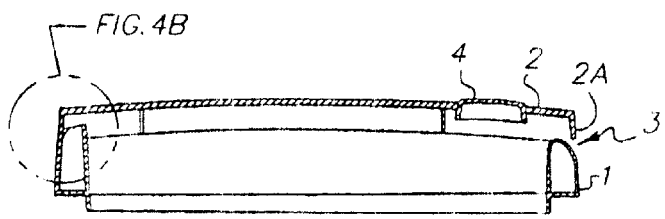
FIG. 4A provides a cross-sectional view through line 3—3 of FIG. 3.
Figure 5:
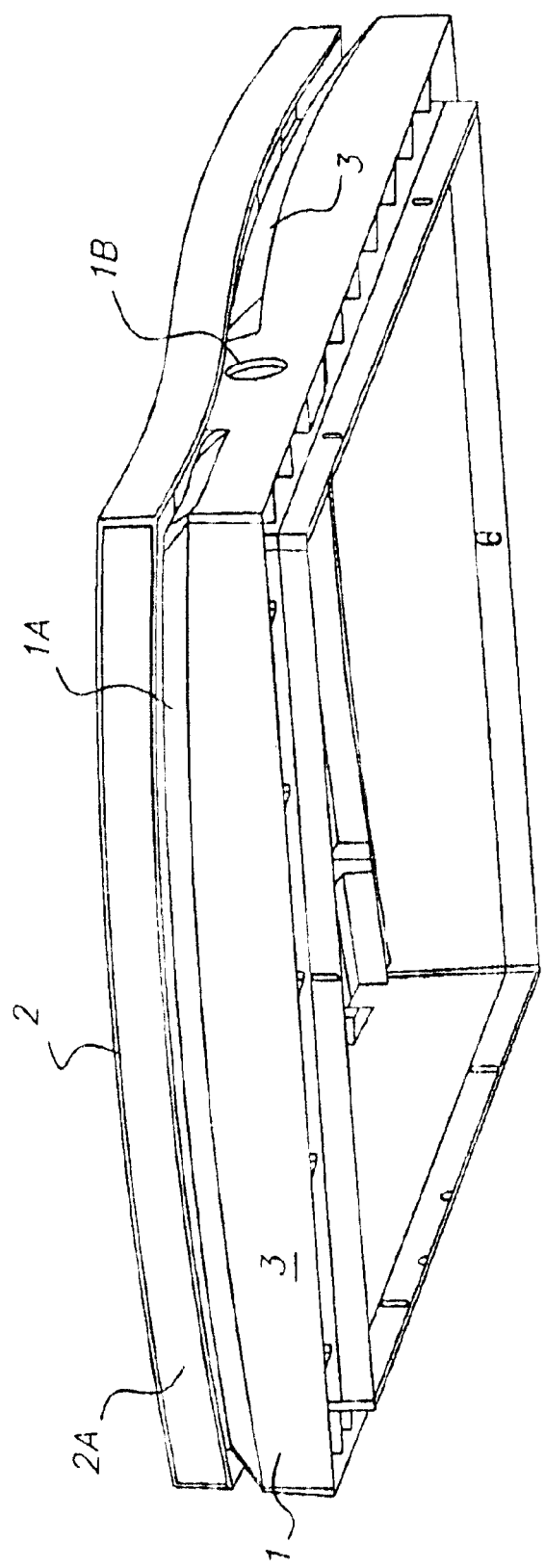
FIG. 5 provides a perspective view of the vented door and frame combination of this invention from below and to the side of a bottom corner.

Frame 1 of our invention can be fastened to a cabinet via screws. Door 2 is mounted to frame 1 via integral snap-in style hinges as illustrated in FIG. 4A and FIG. 4B. As will be noted from review of these figures, the hinge pin 2B of door 2 snaps in and out at an approximate 45-degree angle (as indicated by arrow 2C). Thus, when the door 2 is locked, it cannot be unhinged, but can be unsnapped if necessary when unlocked. On the other side of the door, opposite hinge pins 2B, provision has been made for a latch or key assembly with a keyhole 1B. Finally, a translucent lens 4 in door 2 has been provided to allow the user or servicing technician to view indicator lights on items of equipment inside our cabinet.

We claim:

1. In combination a door and a frame, comprising:

a) the frame defining an opening lying in a plane and having a frame rim baffle portion adjacent the opening, which frame rim baffle portion is inclined outward at an acute angle to the plane with a raised edge adjacent the opening and substantially surrounds the opening; and b) the door hingeably connected to said frame, which door has a periphery with a door rim extending towards said plane substantially all the way around said periphery, which door rim is peripherally adjacent but not abutting said frame rim baffle portion when said door is closed such that a ventilation air passageway is defined by and lies between the frame rim baffle portion and the door rim.

2. A door and frame combination, as described in claim 1, wherein said door is hingeably connected to said frame by a snap hinge.

3. A door and frame combination, as described in claim 1, wherein said door has a lock by which it can be locked when closed.

4. A door and frame combination, as described in claim 1, wherein said door is hingeably connected to said frame by a snap hinge and said door has a lock.

5. A door and frame combination, as described in claim 1, wherein said door has a translucent portion.

\* \* \* \* \*